(12) United States Patent
Mills et al.

(10) Patent No.: US 6,649,025 B2
(45) Date of Patent: Nov. 18, 2003

(54) MULTIPLE PLY PAPER WIPING PRODUCT HAVING A SOFT SIDE AND A TEXTURED SIDE

(75) Inventors: Russell P. Mills, Smallfield (GB); Rick Behm, Appleton, WI (US); Thomas Barta, Lormar (DE); Laurent Paquot, Redhill (GB)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 109 days.

(21) Appl. No.: 10/040,264

(22) Filed: Dec. 31, 2001

(65) Prior Publication Data

US 2003/0121628 A1 Jul. 3, 2003

(51) Int. Cl.⁷ ........................... D21F 11/00; D21H 13/00
(52) U.S. Cl. ........................ 162/123; 162/109; 162/111; 162/113; 162/125; 428/153; 428/154; 428/156; 428/166; 428/172; 428/198; 428/212; 156/209; 156/295
(58) Field of Search .................... 162/109, 111, 162/113, 123, 125; 428/153, 154, 155, 156, 166, 172, 198, 212; 156/209, 295

(56) References Cited

U.S. PATENT DOCUMENTS

| | | |
|---|---|---|
| 3,556,932 A | 1/1971 | Coscia et al. |
| 3,556,933 A | 1/1971 | Williams et al. |
| 3,650,882 A | 3/1972 | Thomas |
| 3,700,623 A | 10/1972 | Keim |
| 3,772,076 A | 11/1973 | Keim |
| 3,837,995 A | 9/1974 | Floden |
| 3,885,158 A | 5/1975 | Flutie et al. |
| 3,899,288 A | 8/1975 | Petrovich et al. |
| 3,940,529 A | 2/1976 | Hepford et al. |
| 3,952,124 A | 4/1976 | Mesek |
| 3,953,638 A | 4/1976 | Kemp |
| 3,994,771 A | 11/1976 | Morgan, Jr. et al. |
| 4,100,017 A | 7/1978 | Flautt, Jr. |
| 4,100,324 A | 7/1978 | Anderson et al. |
| 4,129,528 A | 12/1978 | Petrovich et al. |
| 4,147,586 A | 4/1979 | Petrovich et al. |
| 4,222,921 A | 9/1980 | Van Eenam |
| 4,276,338 A | 6/1981 | Ludwa et al. |
| 4,300,981 A | 11/1981 | Carstens |
| 4,355,021 A | 10/1982 | Mahl et al. |
| 4,426,417 A | 1/1984 | Meitner et al. |
| 4,426,418 A | 1/1984 | Coleman et al. |
| 4,489,118 A | 12/1984 | Endres et al. |

(List continued on next page.)

FOREIGN PATENT DOCUMENTS

| | | |
|---|---|---|
| CA | 2241820 | 2/1999 |
| EP | 0566755 A1 | 10/1993 |
| EP | 0677612 A2 | 10/1995 |
| EP | 0688152 B1 | 8/1996 |
| EP | 0739708 A2 | 10/1996 |
| EP | 0631014 B1 | 10/1997 |
| EP | 0696344 B1 | 8/1998 |
| EP | 1149552 A1 | 10/2001 |
| WO | WO 9500706 | 1/1995 |
| WO | WO 9945771 | 9/1999 |
| WO | WO 0004938 A1 | 2/2000 |

OTHER PUBLICATIONS

EPO Search Report, Apr. 17, 2003.

Primary Examiner—Peter Chin
Assistant Examiner—M. Halpern
(74) Attorney, Agent, or Firm—Dority & Manning, P.A.

(57) ABSTRACT

A laminate wiping product is disclosed. The wiping product includes a first outer ply that has a textured surface. For example, the first outer ply can be an uncreped throughdried paper web having a three-dimensional conformation. The second outer ply, on the other hand, can be a smoother and softer web. The plies are laminated together by any suitable process. In one embodiment, the plies are embossed and nested together to form the final product.

30 Claims, 7 Drawing Sheets

U.S. PATENT DOCUMENTS

| | | |
|---|---|---|
| 4,507,351 A | 3/1985 | Johnson et al. |
| 4,529,840 A | 7/1985 | Colton et al. |
| 4,574,021 A | 3/1986 | Endres et al. |
| 4,637,859 A | 1/1987 | Trokhan |
| 4,675,394 A | 6/1987 | Solarek et al. |
| 4,738,847 A | 4/1988 | Rothe et al. |
| 4,764,418 A | 8/1988 | Kuenn et al. |
| 4,828,912 A | 5/1989 | Hossain et al. |
| 4,919,877 A | 4/1990 | Parsons et al. |
| 4,975,217 A | 12/1990 | Brown-Skrobot et al. |
| 4,981,557 A | 1/1991 | Bjorkquist |
| 5,008,344 A | 4/1991 | Bjorkquist |
| 5,048,589 A | 9/1991 | Cook et al. |
| 5,069,548 A | 12/1991 | Boehnlein |
| 5,079,004 A | 1/1992 | Blank et al. |
| 5,085,736 A | 2/1992 | Bjorkquist |
| 5,087,324 A | 2/1992 | Awofeso et al. |
| 5,180,471 A | 1/1993 | Sauer et al. |
| 5,324,561 A | 6/1994 | Resai et al. |
| 5,324,575 A | 6/1994 | Sultze et al. |
| 5,336,373 A | 8/1994 | Scattolino et al. |
| 5,350,624 A | 9/1994 | Georger et al. |
| 5,372,877 A | 12/1994 | Kannankeril |
| 5,397,435 A | 3/1995 | Ostendorf et al. |
| 5,409,572 A | 4/1995 | Kershaw et al. |
| 5,429,686 A | 7/1995 | Chiu et al. |
| 5,437,908 A | 8/1995 | Demura et al. |
| 5,494,554 A | 2/1996 | Edwards et al. |
| 5,506,035 A | 4/1996 | Van Phan et al. |
| 5,529,665 A | 6/1996 | Kaun |
| 5,534,165 A | 7/1996 | Pilosof et al. |
| 5,556,509 A | 9/1996 | Trokhan et al. |
| 5,652,194 A | 7/1997 | Dyer et al. |
| 5,656,132 A | 8/1997 | Farrington, Jr. et al. |
| 5,656,134 A | 8/1997 | Marinack et al. |
| 5,672,248 A | 9/1997 | Wendt et al. |
| 5,685,954 A | 11/1997 | Marinack et al. |
| 5,690,788 A | 11/1997 | Marinack et al. |
| 5,693,406 A | 12/1997 | Wegele et al. |
| 5,709,775 A | 1/1998 | Trokhan et al. |
| 5,776,312 A | 7/1998 | Trokhan et al. |
| 5,779,860 A | 7/1998 | Hollenberg et al. |
| 5,795,921 A | 8/1998 | Dyer et al. |
| 5,814,190 A | 9/1998 | Van Phan |
| 5,830,558 A | 11/1998 | Barnholtz |
| 5,837,103 A | 11/1998 | Trokhan et al. |
| 5,846,379 A | 12/1998 | Ampulski et al. |
| 5,846,636 A | 12/1998 | Ruppel et al. |
| 5,871,887 A | 2/1999 | Trokhan et al. |
| 5,885,415 A | 3/1999 | Marinack et al. |
| 5,885,417 A | 3/1999 | Marinack et al. |
| 5,904,812 A | 5/1999 | Salman et al. |
| 5,904,971 A | 5/1999 | Anderson et al. |
| 5,906,711 A | 5/1999 | Barnholtz |
| 5,919,556 A | 7/1999 | Barnholtz |
| 5,935,383 A | 8/1999 | Sun et al. |
| 5,980,673 A | 11/1999 | Takeuchi et al. |
| 6,080,279 A | 6/2000 | Hada et al. |
| 6,083,346 A | 7/2000 | Hermans et al. |
| 6,096,169 A | 8/2000 | Hermans et al. |
| 6,120,642 A | 9/2000 | Lindsay et al. |
| 6,129,815 A | 10/2000 | Larson et al. |
| 6,136,422 A | 10/2000 | Lichtenberg et al. |
| 6,143,135 A | 11/2000 | Hada et al. |
| 6,165,585 A | 12/2000 | Trokhan |
| 6,171,442 B1 | 1/2001 | Farrington, Jr. et al. |
| 6,197,154 B1 | 3/2001 | Chen et al. |
| 2002/0060000 A1 | 5/2002 | Du Grosriez et al. |

MULTIPLE PLY PAPER WIPING PRODUCT HAVING A SOFT SIDE AND A TEXTURED SIDE

BACKGROUND OF THE INVENTION

Products made from paper webs such as bath tissues, facial tissues, paper towels, industrial wipers, food service wipers, napkins, medical pads and other similar products are designed to include several important properties. For example, the product should have a relatively soft feel and, for most applications, should be highly absorbent. The product should also have stretch characteristics and should resist tearing in the environment in which they are used. The above properties are especially important when trying to develop a disposable paper wiping product that can serve as a substitute for conventional cloth products.

In the past, various paper wiping products have been developed. For instance, in order to optimize various properties, in the past two or more embossed conventional paper webs have been laminated together. The present invention is directed to further improvements in such laminated wiping products. In particular, the present invention is directed to a wiping product made from separate plies that has different surface characteristics on each side of the product as will be described in greater detail below.

SUMMARY OF THE INVENTION

In general, the present invention is directed to a paper wiping product made from at least two plies. The two outer plies of the product have different properties for producing a laminate that has different surface characteristics on each side of the product. In particular, the wiping product of the present invention includes a rough or textured side and a smooth and soft side. The product can be used in numerous applications, particularly to clean or polish any adjacent surface or object.

In one embodiment, the paper wiping product includes a first outer ply made from an uncreped, throughdried paper web. The first outer ply can have a basis weight of from about 15 gsm to about 80 gsm, and in one embodiment, from about 20 gsm to about 27 gsm. The first outer ply includes a textured surface having an Overall Surface Depth of greater than about 0.1 mm, and particularly greater than about 0.2 mm. The first outer ply can contain softwood fibers, hardwood fibers and high-yield fibers. For example, in one embodiment, the first outer ply includes high-yield fibers in an amount up to about 30% by weight in combination with softwood fibers. The density of the first outer ply can be less than about 0.3 g/cm$^3$.

The paper wiping product includes a second outer ply bound or laminated to the first outer ply. The second outer ply is generally softer and smoother than the first outer ply. The second outer ply has a basis weight less than the first outer ply and can be made from softwood fibers, hardwood fibers and high-yield fibers. In one embodiment, the second outer ply is made from a combination of high-yield fibers and softwood fibers and/or hardwood fibers.

The second outer ply can be made from various paper making processes. For instance, the second outer ply can be creped or uncreped. The second outer ply can also be throughdried or can be dried on a heated cylinder or drum, such as a felted Yankee drum dryer.

The first outer ply can be laminated to the second outer ply by any suitable process. For example, in one embodiment, the first outer ply and the second outer ply are embossed and nested together. Alternatively, one or both of the plies are embossed and secured together in an pin-to-pin or random pin-to-pin (unnested) arrangement. As used herein, a "pin-to-pin" arrangement refers to laminating together two embossed plies in which the raised or embossed areas of each ply contact each other.

Various binder materials, such as adhesives, can be used to secure the layers together. The adhesive can be, for instance, a polyvinyl alcohol, an acetate or a starch adhesive. Alternatively, other binder materials, such as binder fibers, can be inserted between the plies and heated causing the plies to attach together. The binder fibers can be made from, for instance, any suitable thermoplastic polymer, such as polyester, polyethylene or polypropylene. In one embodiment, the binder fibers can be bicomponent fibers. For some applications, the first outer ply and the second outer ply should be bonded together over the entire surface area of the adjacent plies. Alternatively, the binder materials can be applied at selected areas for attaching the plies together. For example, the binder material can be applied to the raised areas on one of the plies.

The binder material can be applied to the plies according to any suitable process. For example, the adhesive, such as a latex adhesive, can be sprayed or printed onto the plies. Binder fibers, however, can be sprayed onto the plies or applied by other means. For example, in one embodiment, an air forming system can be used to apply the binder fibers in between the adjacent layers. Other features, and aspects of the present invention are discussed in greater detail below.

DEFINITIONS AND TEST METHODS

As used herein, "dry bulk" is measured with a thickness gauge having a circular platen 3 inches in diameter such that a pressure of 0.05 psi is applied to the sample, which should be conditioned at 50% relative humidity and at 73° F. for 24 hours prior to measurement. The webs can have a dry bulk of 3 cc/g or greater. The uncreped throughdried webs can have a dry bulk of 6 cc/g or greater, particularly 9 cc/g or greater, and more particularly between 8 cc/g and 28 cc/g.

As used herein, "high-yield pulp fibers" are those paper-making fibers produced by pulping processes providing a yield of about 65 percent or greater, more specifically about 75 percent or greater, and still more specifically from about 75 to about 95 percent. Yield is the resulting amount of processed fiber expressed as a percentage of the initial wood mass. Such pulping processes include bleached chemithermomechanical pulp (BCTMP), chemithermomechanical pulp (CTMP) pressure/pressure thermomechanical pulp (PTMP), thermomechanical pulp (TMP), thermomechanical chemical pulp (TMCP), high-yield sulfite pulps, and high-yield kraft pulps, all of which leave the resulting fibers with high levels of lignin. High-yield fibers are well known for their stiffness (in both dry and wet states) relative to typical chemically pulped fibers. The cell wall of kraft and other non-high-yield fibers tends to be more flexible because lignin, the "mortar" or "glue" on and in part of the cell wall, has been largely removed. Lignin is also nonswelling in water and hydrophobic, and resists the softening effect of water on the fiber, maintaining the stiffness of the cell wall in wetted high-yield fibers relative to kraft fibers. The preferred high-yield pulp fibers can also be characterized by being comprised of comparatively whole, relatively undamaged fibers, high freeness (250 Canadian Standard Freeness (CSF)or greater, more specifically 350 CFS or greater, and still more specifically 400 CFS or greater), and low fines content (less than 25 percent, more specifically less than 20 percent, still more specifically less that 15 percent, and still more specifically less than 10 percent by the Britt jar test).

"Noncompressive drying" refers to drying methods for drying cellulosic webs that do not involve compressive nips or other steps causing significant densification or compression of a portion of the web during the drying process. Such methods include through air drying; air jet impingement drying; non-contacting drying such as air flotation drying, as taught by E. V. Bowden, E. V., Appita J., 44(1): 41 (1991); through flow or impingement of superheated steam; microwave drying and other radio frequency or dielectric drying methods; water extraction by supercritical fluids; water extraction by nonaqueous, low surface tension fluids; infrared drying; drying by contact with a film of molten metal; and other methods. It is believed that the three-dimensional basesheets of the present invention could be dried with any of the above mentioned noncompressive drying means without causing significant web densification or a significant loss of their three-dimensional structure and their wet resiliency properties. Standard dry creping technology is viewed as a compressive drying method since the web must be mechanically pressed onto part of the drying surface, causing significant densification of the regions pressed onto the heated Yankee cylinder.

"Overall Surface Depth". A three-dimensional basesheet or web is a sheet with significant variation in surface elevation due to the intrinsic structure of the sheet itself. As used herein, this elevation difference is expressed as the "Overall Surface Depth." The basesheets useful for this invention possess three-dimensionality and have an Overall Surface Depth of about 0.1 mm. or greater, more specifically about 0.3 mm. or greater, still more specifically about 0.4 mm. or greater, still more specifically about 0.5 mm. or greater, and still more specifically from about 0.4 to about 0.8 mm.

The three-dimensional structure of a largely planar sheet can be described in terms of its surface topography. Rather than presenting a nearly flat surface, as is typical of conventional paper, the molded sheets useful in producing the present invention have significant topographical structures that, in one embodiment, may derive in part from the use of sculptured throughdrying fabrics such as those taught by Chiu et al. in U.S. Pat. No. 5,429,686, which is incorporated by reference. The resulting basesheet surface topography typically comprises a regular repeating unit cell that is typically a parallelogram with sides between 2 and 20 mm in length. For wetlaid materials, it is preferred that these three-dimensional basesheet structures be created by molding the moist sheet or be created prior to drying, rather than by creping or embossing or other operations after the sheet has been dried. In this manner, the three-dimensional basesheet structure is more likely to be well-retained upon wetting, helping to provide high wet resiliency and to promote good in-plane permeability. For air-laid basesheets, the structure may be imparted by thermal embossing of a fibrous mat with binder fibers that are activated by heat. For example, an air-laid fibrous mat containing thermoplastic or hotmelt binder fibers may be heated and then embossed before the structure cools to permanently give the sheet a three-dimensional structure.

In addition to the regular geometrical structure imparted by the sculptured fabrics and other fabrics used in creating a basesheet, additional fine structure, with an in-plane length scale less than about 1 mm, can be present in the basesheet. Such a fine structure can stem from microfolds created during differential velocity transfer of the web from one fabric or wire to another prior to drying. Some of the materials of the present invention, for example, appear to have fine structure with a fine surface depth of 0.1 mm or greater, and sometimes 0.2 mm or greater, when height profiles are measured using a commercial moiré interferometer system. These fine peaks have a typical half-width less than 1 mm. The fine structure from differential velocity transfer and other treatments may be useful in providing additional softness, flexibility, and bulk. Measurement of the surface structures is described below.

An especially suitable method for measurement of Overall Surface Depth is moiré interferometry, which permits accurate measurement without deformation of the surface. For reference to the materials of the present invention, surface topography should be measured using a computer-controlled white-light field-shifted moiré interferometer with about a 38 mm field of view. The principles of a useful implementation of such a system are described in Bieman et al. (L. Bieman, K. Harding, and A. Boehnlein, "Absolute Measurement Using Field-Shifted Moiré," SPIE Optical Conference Proceedings, Vol. 1614, pp. 259–264, 1991). A suitable commercial instrument for moiré interferometry is the CADEYES® interferometer produced by Medar, Inc. (Farmington Hills, Mich.), constructed for a 38-mm field-of-view (a field of view within the range of 37 to 39.5 mm is adequate). The CADEYES® system uses white light which is projected through a grid to project fine black lines onto the sample surface. The surface is viewed through a similar grid, creating moiré fringes that are viewed by a CCD camera. Suitable lenses and a stepper motor adjust the optical configuration for field shifting (a technique described below). A video processor sends captured fringe images to a PC computer for processing, allowing details of surface height to be back-calculated from the fringe patterns viewed by the video camera.

In the CADEYES moiré interferometry system, each pixel in the CCD video image is said to belong to a moiré fringe that is associated with a particular height range. The method of field-shifting, as described by Bieman et al. (L. Bieman, K. Harding, and A. Boehnlein, "Absolute Measurement Using Field-Shifted Moiré," SPIE Optical Conference Proceedings, Vol. 1614, pp. 259–264, 1991) and as originally patented by Boehnlein (U.S. Pat. No. 5,069,548, herein incorporated by reference), is used to identify the fringe number for each point in the video image (indicating which fringe a point belongs to). The fringe number is needed to determine the absolute height at the measurement point relative to a reference plane. A field-shifting technique (sometimes termed phase-shifting in the art) is also used for sub-fringe analysis (accurate determination of the height of the measurement point within the height range occupied by its fringe). These field-shifting methods coupled with a camera-based interferometry approach allows accurate and rapid absolute height measurement, permitting measurement to be made in spite of possible height discontinuities in the surface. The technique allows absolute height of each of the roughly 250,000 discrete points (pixels) on the sample surface to be obtained, if suitable optics, video hardware, data acquisition equipment, and software are used that incorporates the principles of moiré interferometry with field-shifting. Each point measured has a resolution of approximately 1.5 microns in its height measurement.

The computerized interferometer system is used to acquire topographical data and then to generate a grayscale image of the topographical data, said image to be hereinafter called "the height map." The height map is displayed on a computer monitor, typically in 256 shades of gray and is quantitatively based on the topographical data obtained for the sample being measured. The resulting height map for the 38-mm square measurement area should contain approximately 250,000 data points corresponding to approximately 500 pixels in both the horizontal and vertical directions of the displayed height map. The pixel dimensions of the height map are based on a 512×512 CCD camera which provides images of moiré patterns on the sample which can be analyzed by computer software. Each pixel in the height map represents a height measurement at the corresponding x- and y-location on the sample. In the recommended system, each pixel has a width of approximately 70 microns, i.e. represents a region on the sample surface about 70 microns long in both orthogonal in-plane directions). This level of resolution prevents single fibers projecting above the surface from having a significant effect on the surface height measurement. The z-direction height measurement must have a nominal accuracy of less than 2 microns and a z-direction range of at least 1.5 mm. (For further background on the measurement method, see the CADEYES Product Guide, Medar, Inc., Farmington Hills, Mich., 1994, or other CADEYES manuals and publications of Medar, Inc.)

The CADEYES system can measure up to 8 moiré fringes, with each fringe being divided into 256 depth counts (sub-fringe height increments, the smallest resolvable height difference). There will be 2048 height counts over the measurement range. This determines the total z-direction range, which is approximately 3 mm in the 38-mm field-of-view instrument. If the height variation in the field of view covers more than eight fringes, a wrap-around effect occurs, in which the ninth fringe is labeled as if it were the first fringe and the tenth fringe is labeled as the second, etc. In other words, the measured height will be shifted by 2048 depth counts. Accurate measurement is limited to the main field of 8 fringes.

The moiré interferometer system, once installed and factory calibrated to provide the accuracy and z-direction range stated above, can provide accurate topographical data for materials such as paper towels. (Those skilled in the art may confirm the accuracy of factory calibration by performing measurements on surfaces with known dimensions.) Tests are performed in a room under Tappi conditions (73° F., 50% relative humidity). The sample must be placed flat on a surface lying aligned or nearly aligned with the measurement plane of the instrument and should be at such a height that both the lowest and highest regions of interest are within the measurement region of the instrument.

Once properly placed, data acquisition is initiated using Medar's PC software and a height map of 250,000 data points is acquired and displayed, typically within 30 seconds from the time data acquisition was initiated. (Using the CADEYES® system, the "contrast threshold level" for noise rejection is set to 1, providing some noise rejection without excessive rejection of data points.) Data reduction and display are achieved using CADEYES® software for PCs, which incorporates a customizable interface based on Microsoft Visual Basic Professional for Windows (version 3.0). The Visual Basic interface allows users to add custom analysis tools.

The height map of the topographical data can then be used by those skilled in the art to identify characteristic unit cell structures (in the case of structures created by fabric patterns; these are typically parallelograms arranged like tiles to cover a larger two-dimensional area) and to measure the typical peak to valley depth of such structures. A simple method of doing this is to extract two-dimensional height profiles from lines drawn on the topographical height map which pass through the highest and lowest areas of the unit cells. These height profiles can then be analyzed for the peak to valley distance, if the profiles are taken from a sheet or portion of the sheet that was lying relatively flat when measured. To eliminate the effect of occasional optical noise and possible outliers, the highest 10% and the lowest 10% of the profile should be excluded, and the height range of the remaining points is taken as the surface depth. Technically, the procedure requires calculating the variable which we term "P10," defined at the height difference between the 10% and 90% material lines, with the concept of material lines being well known in the art, as explained by L. Mummery, in *Surface Texture Analysis: The Handbook*, Hommelwerke GmbH, Mühlhausen, Germany, 1990. In this approach, which will be illustrated with respect to FIG. 7, the surface 31 is viewed as a transition from air 32 to material 33. For a given profile 30, taken from a flat-lying sheet, the greatest height at which the surface begins—the height of the highest peak—is the elevation of the "0% reference line" 34 or the "0% material line," meaning that 0% of the length of the horizontal line at that height is occupied by material. Along the horizontal line passing through the lowest point of the profile, 100% of the line is occupied by material, making that line the "100% material line" 35. In between the 0% and 100% material lines (between the maximum and minimum points of the profile), the fraction of horizontal line length occupied by material will increase monotonically as the line elevation is decreased. The material ratio curve 36 gives the relationship between material fraction along a horizontal line passing through the profile and the height of the line. The material ratio curve is also the cumulative height distribution of a profile. (A more accurate term might be "material fraction curve.")

Once the material ratio curve is established, one can use it to define a characteristic peak height of the profile. The P10 "typical peak-to-valley height" parameter is defined as the difference 37 between the heights of the 10% material line 38 and the 90% material line 39. This parameter is relatively robust in that outliers or unusual excursions from the typical profile structure have little influence on the P10 height. The units of P10 are mm. The Overall Surface Depth of a material is reported as the P10 surface depth value for profile lines encompassing the height extremes of the typical unit cell of that surface. "Fine surface depth" is the P10 value for a profile taken along a plateau region of the surface which is relatively uniform in height relative to profiles encompassing a maxima and minima of the unit cells. Measurements are reported for the most textured side of the basesheets of the present invention, which is typically the side that was in contact with the throughdrying fabric when air flow is toward the throughdryer. FIG. 8 represents a profile of Example 13 of the present invention, discussed below, having an Overall Surface Depth of about 0.5.

Overall Surface Depth is intended to examine the topography produced in the tissue web, especially those features created in the sheet prior to and during drying processes, but is intended to exclude "artificially" created large-scale topography from dry converting operations such as embossing, perforating, pleating, etc. Therefore, the profiles examined should be taken from unembossed regions if the tissue web has been embossed, or should be measured on an unembossed tissue web. Overall Surface Depth measurements should exclude large-scale structures such as pleats or folds which do not reflect the three-dimensional nature of the original basesheet itself. It is recognized that sheet topography may be reduced by calendering and other operations which affect the entire basesheet. Overall Surface Depth measurement can be appropriately performed on a calendered basesheet.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figure in which.

Figure 1:
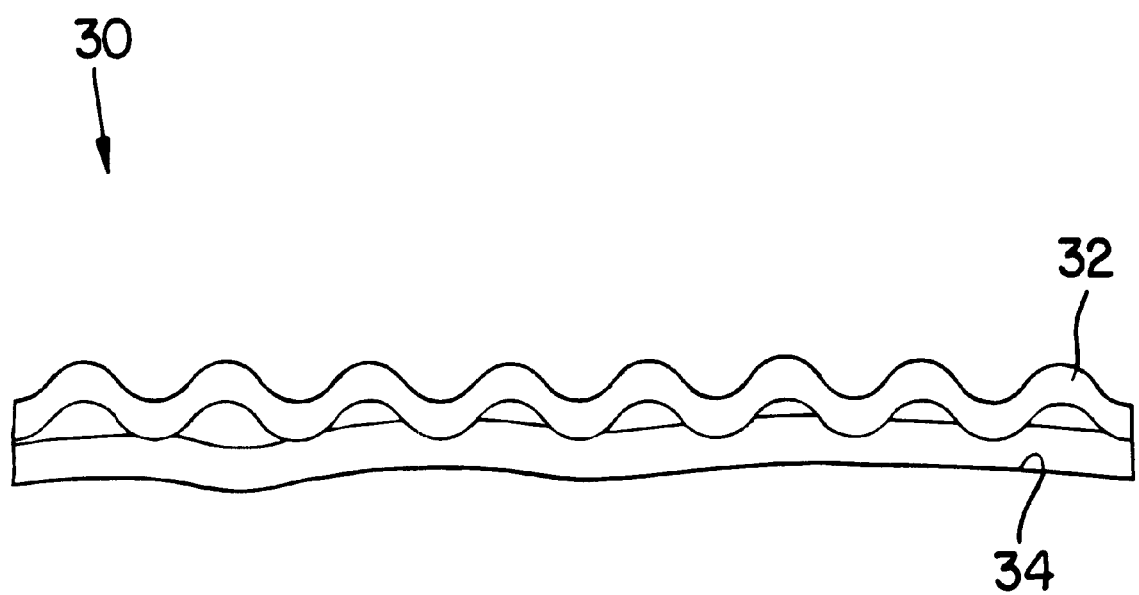
FIG. 1 is a cross-sectional view of one embodiment of a wiping product made in accordance with the present invention.

Repeat use of reference characters in the present specification and drawings is intended to represent same or analogous features or elements of the present invention.

DETAILED DESCRIPTION OF PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

In general, the present invention is directed to a laminated wiping product. The wiping product can be used as a paper towel, as an industrial wiper, or in other similar applications. The wiping product is made by combining together at least two different paper webs. The paper webs are attached together such that the wiping product has different surface characteristics on each side of the wiper. In particular, the wiping product includes a relatively rough or textured surface on one side of the laminate and a softer and smoother surface on the other side of the laminate.

Referring to FIG. 1, for purposes of explanation only, a cross-sectional view of one embodiment of a laminate wiping product generally 30 made in accordance with the present invention is shown. As illustrated, the wiping product 30 includes a first paper web 32 attached to a second paper web 34. Paper web 32 is generally heavier than paper web 34 and includes a more textured outer surface. Paper web 34, on the other hand, generally has a lower basis weight than paper web 32 and has a smoother surface. Paper web 34 can also have a softer feel than paper web 32.

Paper web 34 can be joined to paper web 32 by any suitable means. For instance, an adhesive can be used to attach the two webs together. The webs can be attached together after one web is embossed, or after both webs have been embossed. The webs can be joined in a nested arrangement or in an unnested arrangement as will be described in more detail below.

The first paper web 32 is a web that contains high levels of bulk. Further, the web should have a substantial amount of wet strength and wet resilience for use in wet environments. As described above, the paper web should also be textured having a three-dimensional structure. For instance, the paper web can have an Overall Surface Depth of greater than about 0.2 mm, and particularly greater than about 0.4 mm.

In one embodiment, the first paper web 32 is a textured web which has been dried in a three-dimensional state such that the hydrogen bonds joining fibers were substantially formed while the web was not in a flat, planar state. For instance, the web can be formed while the web is on a highly textured throughdrying fabric or other three-dimensional substrate. Processes for producing uncreped throughdried fabrics are, for instance, disclosed in commonly owned U.S. patent application Ser. No. 08/912,906, "Web Resilient Webs and Disposable Articles Made Therewith" filed Aug. 15, 1997 by Chen, et al.; and U.S. Pat. No. 5,672,248 to Wendt, et al.; U.S. Pat. No. 5,656,132 to Farrington, et al.; U.S. Pat. No. 6,120,642 to Lindsay and Burazin; U.S. Pat. No. 6,096,169 to Hermans, et al.; U.S. Pat. No. 6,197,154 to Chen, et al.; and U.S. Pat. No. 6,143,135 to Hada, et al. all of which are herein incorporated by reference in their entireties.

The uncreped throughdried paper web can have a density of about 0.3 grams per cubic centimeter or less and a three-dimensional surface having an Overall Surface Depth of about 0.1 mm or greater. The web can include a wet strength agent and at least about five percent (5%) by weight of high-yield pulp fibers, such as thermomechanical pulp. In addition to high-yield pulp fibers, the web can contain paper making fibers, such as softwood fibers and/or hardwood fibers. In one embodiment, the web is made entirely from high-yield pulp fibers and softwood fibers. The softwood fibers can be present in an amount from about 95% to about 70% by weight.

Figure 2:
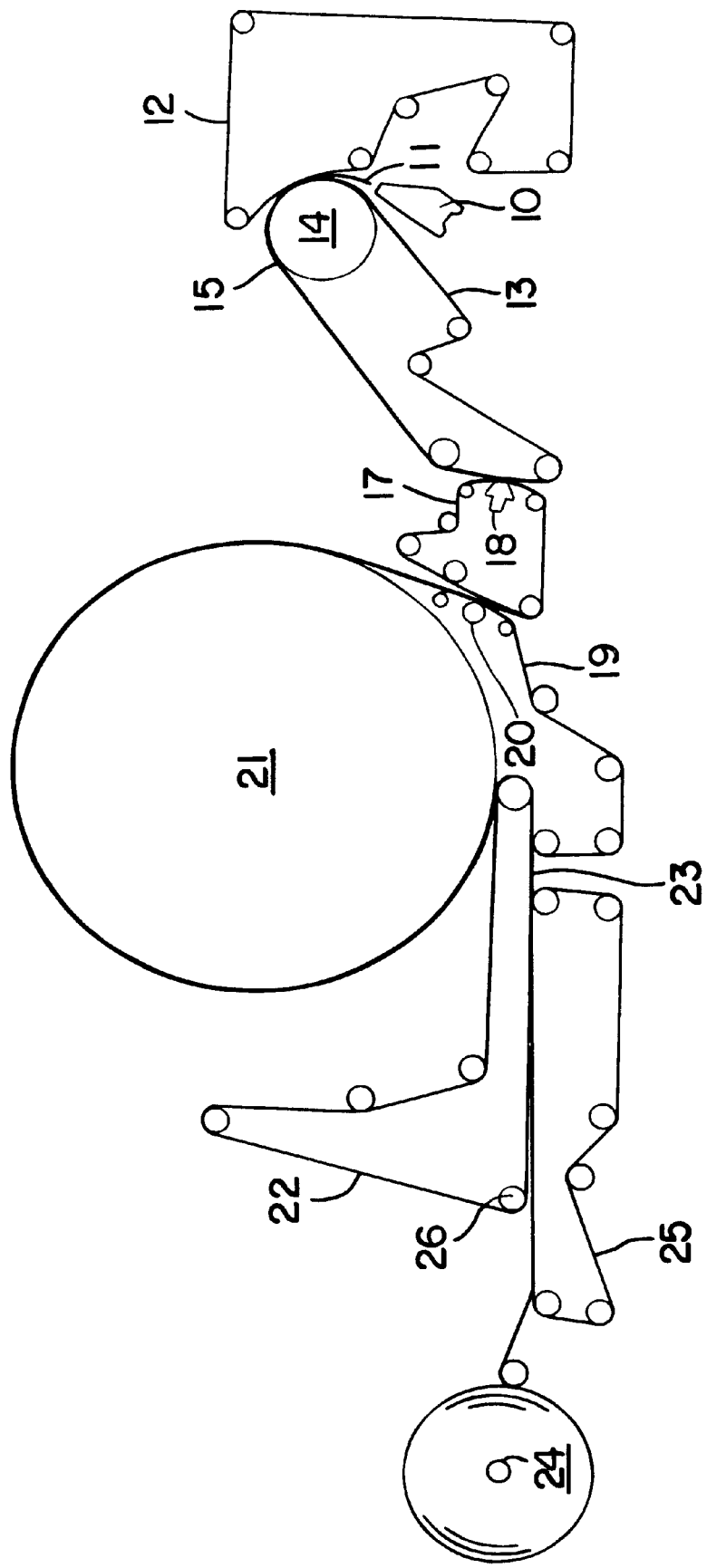
FIG. 2 is a plan view of one embodiment of a process for forming uncreped throughdried paper webs for use in the present invention.

Referring to FIG. 2, shown is a method for making throughdried paper sheets in accordance with this invention. (For simplicity, the various tensioning rolls schematically used to define the several fabric runs are shown but not numbered. It will be appreciated that variations from the apparatus and method illustrated in FIG. 2 can be made without departing from the scope of the invention). Shown is a twin wire former having a layered papermaking headbox 10 which injects or deposits a stream 11 of an aqueous suspension of papermaking fibers onto the forming fabric 13 which serves to support and carry the newly-formed wet web downstream in the process as the web is partially dewatered to a consistency of about 10 dry weight percent. Additional dewatering of the wet web can be carried out, such as by vacuum suction, while the wet web is supported by the forming fabric.

The wet web is then transferred from the forming fabric to a transfer fabric 17 traveling at a slower speed than the forming fabric in order to impart increased stretch into the web. This is commonly referred to as a "rush" transfer. Preferably the transfer fabric can have a void volume that is equal to or less than that of the forming fabric. The relative speed difference between the two fabrics can be from 0–60 percent, more specifically from about 10–40 percent. Transfer is preferably carried out with the assistance of a vacuum shoe 18 such that the forming fabric and the transfer fabric simultaneously converge and diverge at the leading edge of the vacuum slot.

The web is then transferred from the transfer fabric to the throughdrying fabric 19 with the aid of a vacuum transfer roll 20 or a vacuum transfer shoe, optionally again using a fixed gap transfer as previously described. The throughdrying fabric can be traveling at about the same speed or a different speed relative to the transfer fabric. If desired, the throughdrying fabric can be run at a slower speed to further enhance stretch. Transfer is preferably carried out with vacuum assistance to ensure deformation of the sheet to conform to the throughdrying fabric, thus yielding desired bulk and appearance. Suitable throughdrying fabrics are described in U.S. Pat. No. 5,429,686 issued to Kai F. Chiu et al. and U.S. Pat. No. 5,672,248 to Wendt, et al. which are incorporated by reference.

In one embodiment, the throughdrying fabric contains high and long impression knuckles. For example, the throughdrying fabric can have about from about 5 to about 300 impression knuckles per square inch which are raised at least about 0.005 inches above the plane of the fabric. During drying, the web is macroscopically arranged to conform to the surface of the throughdrying fabric.

The level of vacuum used for the web transfers can be from about 3 to about 15 inches of mercury (75 to about 380 millimeters of mercury), preferably about 5 inches (125 millimeters) of mercury. The vacuum shoe (negative pressure) can be supplemented or replaced by the use of positive pressure from the opposite side of the web to blow the web onto the next fabric in addition to or as a replacement for sucking it onto the next fabric with vacuum. Also, a vacuum roll or rolls can be used to replace the vacuum shoe(s).

While supported by the throughdrying fabric, the web is final dried to a consistency of about 94 percent or greater by the throughdryer 21 and thereafter transferred to a carrier fabric 22. The dried basesheet 23 is transported to the reel 24 using carrier fabric 22 and an optional carrier fabric 25. An optional pressurized turning roll 26 can be used to facilitate transfer of the web from carrier fabric 22 to fabric 25. Suitable carrier fabrics for this purpose are Albany International 84M or 94M and Asten 959 or 937, all of which are relatively smooth fabrics having a fine pattern. Although not shown, reel calendering or subsequent off-line calendering can be used to improve the smoothness and softness of the basesheet.

Figure 3:
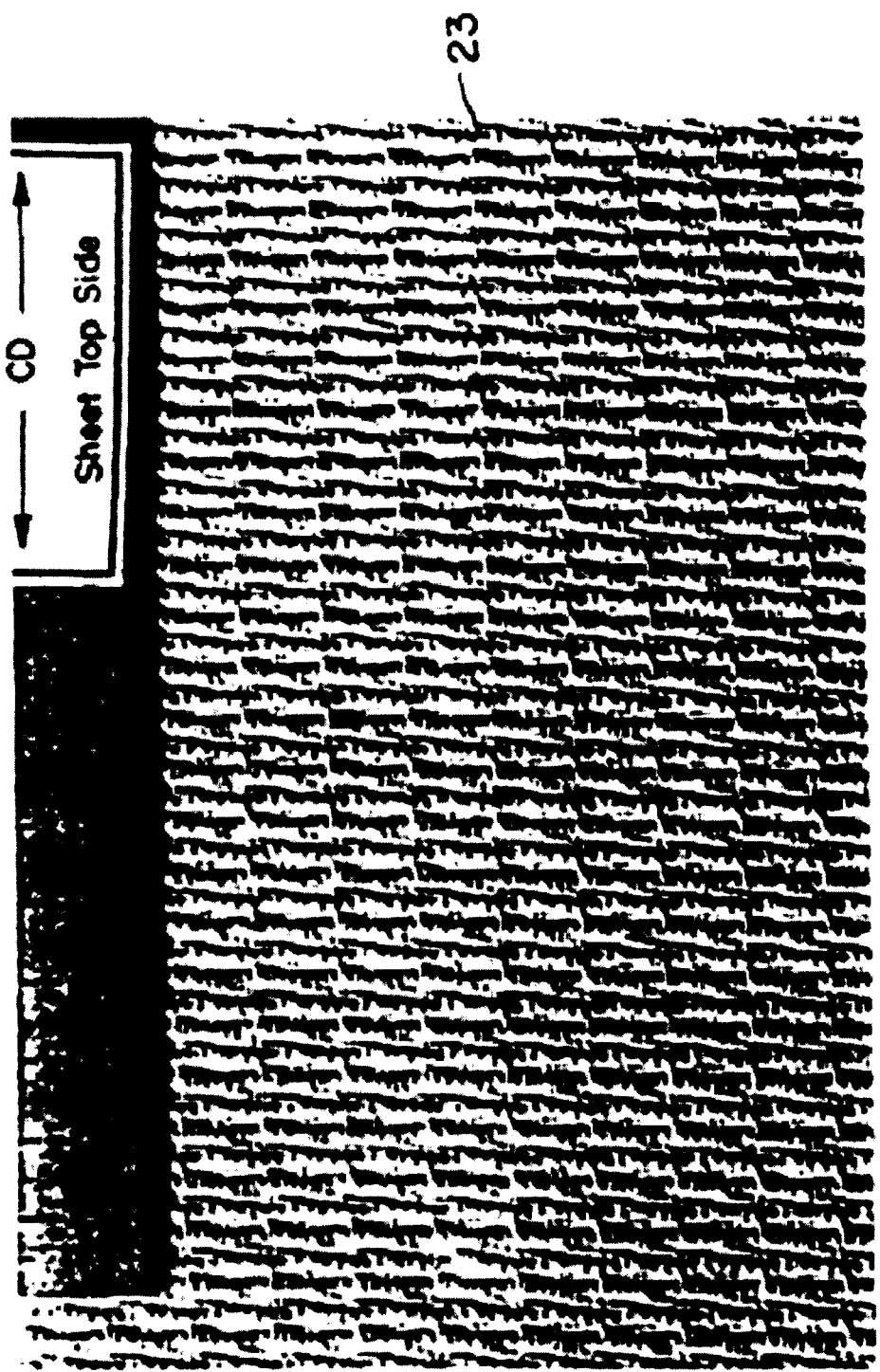
FIG. 3 is a top view of the dryer side surface of one embodiment of an uncreped throughdried paper web that may be incorporated into the product in the present invention.
Figure 4:
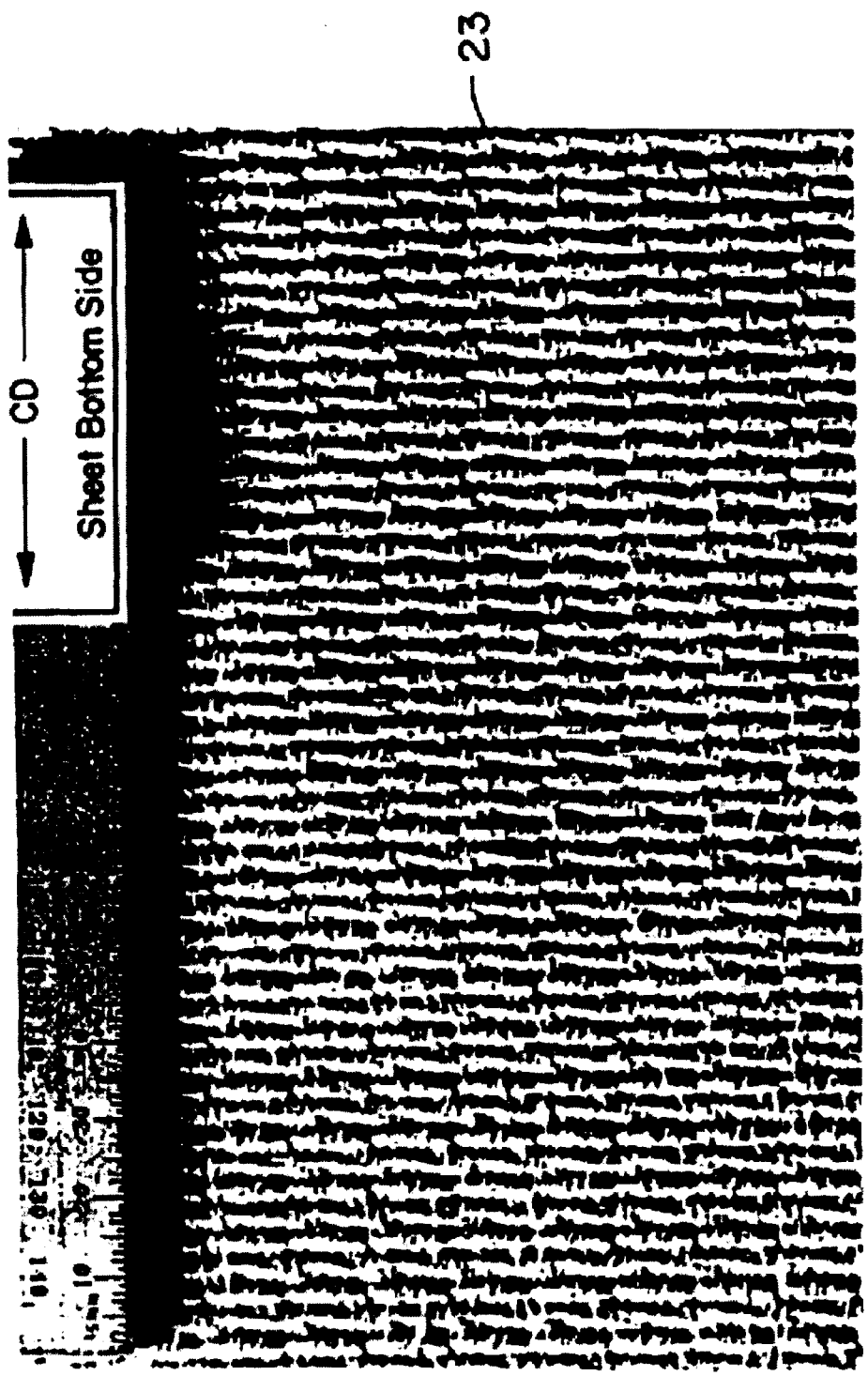
FIG. 4 is a top view of the opposite of the paper web shown in FIG. 3.

Referring to FIGS. 3 and 4, one embodiment of an uncreped throughdried tissue sheet made in accordance with the process shown in FIG. 2 is illustrated. In particular, FIG. 3 is an illustration showing the dryer side of the paper web, while FIG. 4 is an illustration of the air side of the paper web.

In order to improve wet resiliency, the paper web can contain wet resilient fibers, such as high-yield fibers as described above. High-yield fibers include, for instance, thermomechanical pulp, such as bleached chemithermomechanical pulp (BCT&P). The amount of high-yield pulp fibers present in the sheet can vary depending upon the particular application. For instance, the high-yield pulp fibers can be present in an amount of about 5 dry weight percent or greater, or specifically, about 15 dry weight percent or greater, and still more specifically from about 15 to about 30%.

In one embodiment, the uncreped throughdried web can be formed from multiple layers of a fiber furnish. Both strength and softness are achieved through layered webs, such as those produced from stratified headboxes wherein at least one layer delivered by the headbox comprises softwood fibers while another layer comprises hardwood or other fiber types. Layered structures produced by any means known in the art are within the scope of the present invention, including those disclosed by Edwards, et al. in U.S. Pat. No. 5,494,554, which is incorporated herein by reference.

In one embodiment, for instance, a layered or stratified web is formed that contains high-yield pulp fibers in the center. Because high-yield pulp fibers are generally less soft than other paper making fibers, in some applications it is advantageous to incorporate them in to the middle of the paper web, such as by being placed in the center of a three-layered sheet. The outer layers of the sheet can then be made from softwood fibers and/or hardwood fibers.

In addition to containing high-yield fibers, the paper web can also contain a wet strength agent to improve wet resiliency. In fact, the combination of non-compressive drying to mold a three-dimensional paper web, coupled with wet strength additives and applying wet resilient fibers produces webs that maintain an unusually high bulk when wet, even after being compressed.

"Wet strength agents" are materials used to immobilize the bonds between the fibers in the wet state. Any material that when added to a paper web or sheet results in providing the sheet with a wet geometric tensile strength dry geometric tensile strength ratio in excess of 0.1 will, for purposes of this invention, be termed a wet strength agent. Typically these materials are termed either as permanent wet strength agents or as "temporary" wet strength agents. For the purposes of differentiating permanent from temporary wet strength, permanent will be defined as those resins which, when incorporated into paper or tissue products, will provide a product that retains more than 50% of its original wet strength after exposure to water for a period of at least five minutes. Temporary wet strength agents are those which show less than 50% of their original wet strength after being saturated with water for five minutes. Both classes of material find application in the present invention, though permanent wet strength agents are believed to offer advantages when a pad of the present invention is to be reused or used in a wet state for a prolonged period of time.

The amount of wet strength agent added to the pulp fibers can be at least about 0.1 dry weight percent, more specifically about 0.2 dry weight percent or greater, and still more specifically from about 0.1 to about 3 dry weight percent based on the dry weight of the fibers.

Permanent wet strength agents will provide a more or less long-term wet resilience to the structure. In contrast, the temporary wet strength agents would provide structures that had low density and high resilience, but would not provide a structure that had long-term resistance to exposure to water or body fluids. The mechanism by which the wet strength is generated has little influence on the products of this invention as long as the essential property of generating water-resistant bonding at the fiber/fiber bond points is obtained.

Suitable permanent wet strength agents are typically water soluble, cationic oligomeric or polymeric resins that are capable of either crosslinking with themselves (homocrosslinking) or with the cellulose or other constituent of the wood fiber. The most widely-used materials for this purpose are the class of polymer known as polyamide-polyamine-epichlorohydrin (PAE) type resins. These materials have been described in patents issued to Keim (U.S. Pat. Nos. 3,700,623 and 3,772,076) and are sold by Hercules, Inc., Wilmington, Del., as KYMENE 557H. Related materials are marketed by Henkel Chemical Co., Charlotte, N.C. and Georgia-Pacific Resins, Inc., Atlanta, Ga.

Polyamide-epichlorohydrin resins are also useful as bonding resins in this invention. Materials developed by Monsanto and marketed under the SANTO RES label are base-activated polyamide-epichlorohydrin resins that can be used in the present invention. These materials are described in patents issued to Petrovich (U.S. Pat. No. 3,885,158; U.S. Pat. No. 3,899,388; U.S. Pat. No. 4,129,528 and U.S. Pat. No. 4,147,586) and van Eenam (U.S. Pat. No. 4,222,921). Although they are not as commonly used in consumer products, polyethylenimine resins are also suitable for immobilizing the bond points in the products of this invention. Another class of permanent-type wet strength agents are exemplified by the aminoplast resins obtained by reaction of formaldehyde with melamine or urea.

Suitable temporary wet strength resins include, but are not limited to, those resins that have been developed by American Cyanamid and are marketed under the name PAREZ 631 NC (now available from Cytec Industries, West Paterson, N.J.). This and similar resins are described in U.S. Pat. Nos. 3,556,932 to Coscia et al. and 3,556,933 to Williams et al. Other temporary wet strength agents that should find application in this invention include modified starches such as those available from National Starch and marketed as CO-BOND 1000. It is believed that these and related starches are disclosed in U.S. Pat. No. 4,675,394 to Solarek et al. Derivatized dialdehyde starches, such as described in Japanese Kokai Tokkyo Koho JP 03,185,197, may also provide temporary wet strength. It is also expected that other temporary wet strength materials such as those described in U.S. Pat. No. 4,981,557; U.S. Pat. No. 5,008,344 and U.S. Pat. No. 5,085,736 to Bjorkquist would be of use in this invention. With respect to the classes and the types of wet strength resins listed, it should be understood that this listing is simply to provide examples and that this is neither meant to exclude other types of wet strength resins, nor is it meant to limit the scope of this invention.

Although wet strength agents as described above find particular advantage for use in connection with this invention, other types of bonding agents can also be used to provide the necessary wet resiliency. They can be applied at the wet end of the basesheet manufacturing process or applied by spraying or printing, etc. after the basesheet is formed or after it is dried.

As described above and as shown in FIG. 1, the highly textured paper web 32 is attached to a second paper web 34. The second paper web 34 has a smoother and softer surface than paper web 32. Further, the second paper web generally has a lower basis weight. In one embodiment, the second paper web is a tissue web.

For instance, the second paper web can have a basis weight of from about 10 gsm to about 60 gsm, particularly from about 12 gsm to about 30 gsm, and in one embodiment, from about 19 gsm to about 23 gsm.

The fiber furnish used to form the second base web can generally contain the same fibers described above with respect to the first paper web 32. For example, the second paper web can be made containing softwood fibers, hardwood fibers, and high-yield fibers. When present, the high-yield fibers can be added in the same amount as described above.

In order to increase softness, the second base web can contain hardwood fibers, such as Eucalyptus fibers. The hardwood fibers can be present in combination with softwood fibers and/or high-yield fibers. In general, hardwood fibers can be present in the second paper web in an amount of at least 10% by weight, particularly from about 20% to about 60% by weight, and more particularly from about 30% to about 40% by weight.

In one embodiment, the second paper web can have a stratified fiber furnish having at least two principal layers, particularly three principal layers. For example, in one embodiment, the web can have outer layers containing hardwood fibers and/or softwood fibers and a middle layer containing high-yield fibers alone or in combination with softwood fibers and/or hardwood fibers. The weight of each layer of the stratified base web in relation to the total weight of the web is generally not critical. For instance, the weight of each outer layer can be from about 15% to about 40% of the total weight of the web, and particularly from about 25% to about 35% of the weight of the web.

The manner in which the second base web 34 of the present invention is formed may vary depending upon the particular application. In one embodiment, for instance, the second paper web can be an airlaid web or a web formed by foam forming processes, wherein the fibers are entrained or suspended in a foam prior to dewatering.

Figure 5:
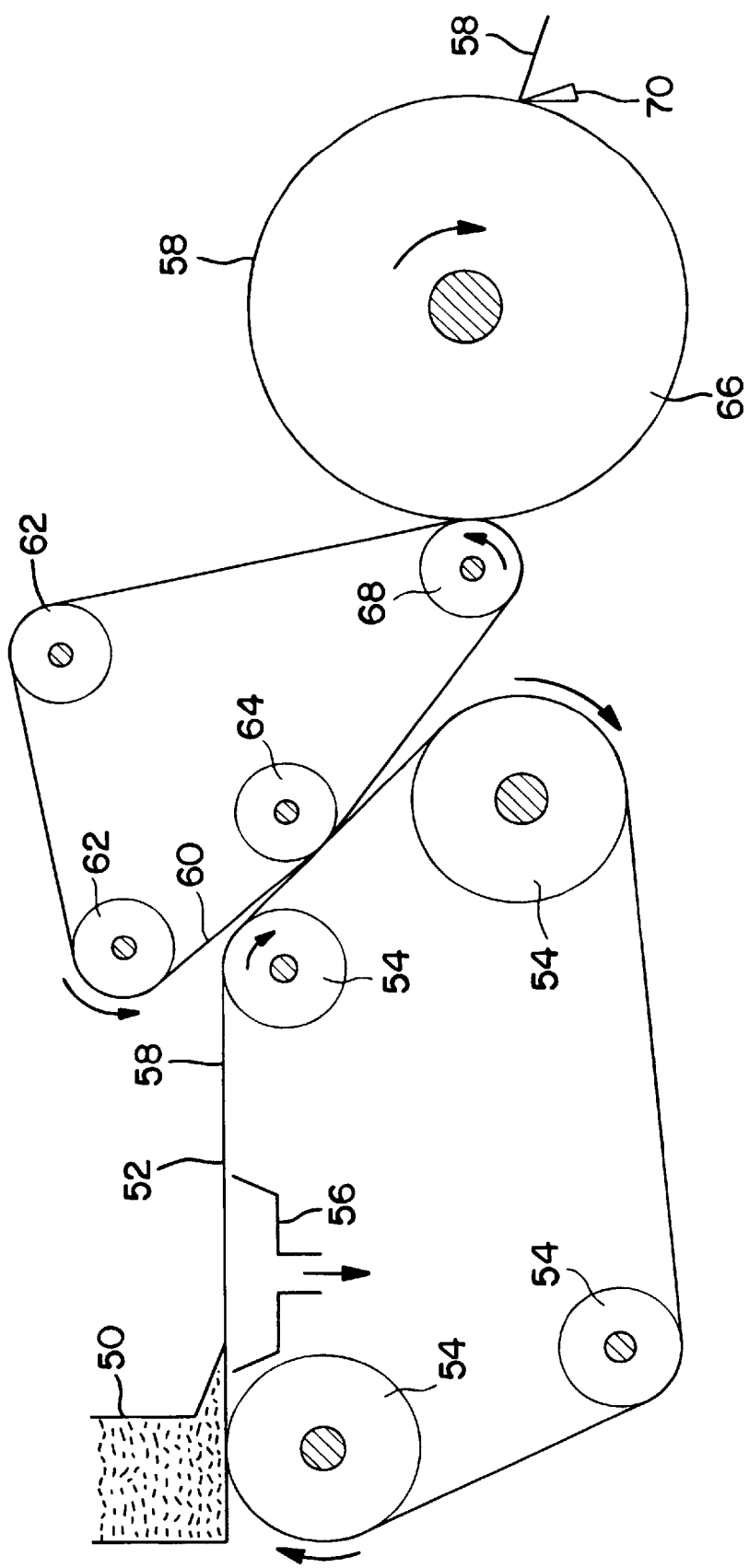
FIG. 5 is a plan view of one embodiment for forming a creped paper web for use in the present invention.

In an alternative environment, the web can be wetlaid, such as webs formed with known paper making techniques wherein a dilute aqueous fiber slurry is disposed on a moving wire to filter out the fibers and form an embryonic web. Such webs can include wet creped webs, light dry creped webs that are creped using an adhesive, creped throughdried webs, and uncreped throughdried webs. Referring to FIG. 5, one embodiment of a process for producing a lightly creped web is illustrated.

As shown in FIG. 5, the web-forming system includes a headbox 50 for receiving an aqueous suspension of fibers. Headbox 50 spreads the aqueous suspension of fibers onto a forming fabric 52 that is supported and driven by a plurality of guide rolls 54. A vacuum box 56 is disposed beneath forming fabric 52 and is adapted to remove water from the fiber furnish to assist in forming a web.

From forming fabric 52, a formed web 58 is transferred to a second fabric 60, which may be either a wire or a felt. Fabric 60 is supported for movement around a continuous path by a plurality of guide rolls 62. Also included is a pick up roll 64 designed to facilitate transfer of web 58 from fabric 52 to fabric 60. The speed at which fabric 60 can be driven is approximately the same speed at which fabric 52 is driven so that movement of web 58 through the system is consistent. Alternatively, the two fabrics can be run at different speeds, such as in a rush transfer process, in order to increase the bulk of the webs or for some other purpose.

From fabric 60, web 58, in this embodiment, is pressed onto the surface of a rotatable heated dryer drum 66, such as a Yankee dryer, by a press roll 68. Web 58 is lightly pressed into engagement with the surface of dryer drum 66 to which it adheres, due to its moisture content and its preference for the smoother of the two surfaces. Alternatively, an adhesive can be used to adhere the web to the dryer drum. As web 58 is carried through a portion of the rotational path of the dryer surface, heat is imparted to the web causing most of the moisture contained within the web to be evaporated.

Web 58 is then removed from dryer drum 66 by a creping blade 70. Creping web 58 as it is formed reduces internal bonding within the web and increases softness.

In some embodiments, it is desirable to limit the amount of inner fiber-to-fiber bond strength. In this regard, the fiber furnish used to form the second base web can be treated with a chemical debonding agent. The debonding agent can be added to the fiber slurry during the pulping process or can be added directly into the headbox. Suitable debonding agents that may be used in the present invention include cationic debonding agents such as fatty dialkyl quaternary amine salts, mono fatty alkyl tertiary amine salts, primary amine salts, imidazoline quaternary salts, and unsaturated fatty alkyl amine salts. Other suitable debonding agents are disclosed in U.S. Pat. No. 5,529,665 to Kaun which is incorporated herein by reference.

In one embodiment, the debonding agent used in the process of the present invention can be an organic quaternary ammonium chloride. In this embodiment, the debonding agent can be added to the fiber slurry in an amount from about 0.1% to about 1% by weight, based on the total weight of fibers present within the slurry.

It should be understood, however, that the creped web produced in FIG. 5 is merely one embodiment of a soft lower basis weight paper web that can be incorporated in to the present invention. Creped and uncreped throughdried webs are suitable alternatives to webs made in accordance with the process shown in FIG. 5. In this embodiment, however, when using a throughdryer, a relatively low topography fabric should be used in order to form a smooth surface on the web.

The manner in which the first paper web 32 is laminated to the second paper web 34 will depend upon the structure of the webs and the particular application. In most applications, a binder material, such as an adhesive or binder fibers, is applied to one or both webs in order to join the webs together. The adhesive can be, for instance, a latex adhesive, a starch-based adhesive, an acetate such as an ethylene vinyl acetate adhesive, a polyvinyl alcohol adhesive, and the like. It should be understood, however, that other binder materials, such as thermoplastic films and fibers can also be used to join the webs. For many applications, the binder material should be spread evenly over the surfaces of the web in order to securely attach the webs together.

In one embodiment, one or both of the webs can be embossed prior to adhesively attaching the webs together. Once embossed, the webs can be nested or in a pin-to-pin arrangement.

Figure 6:
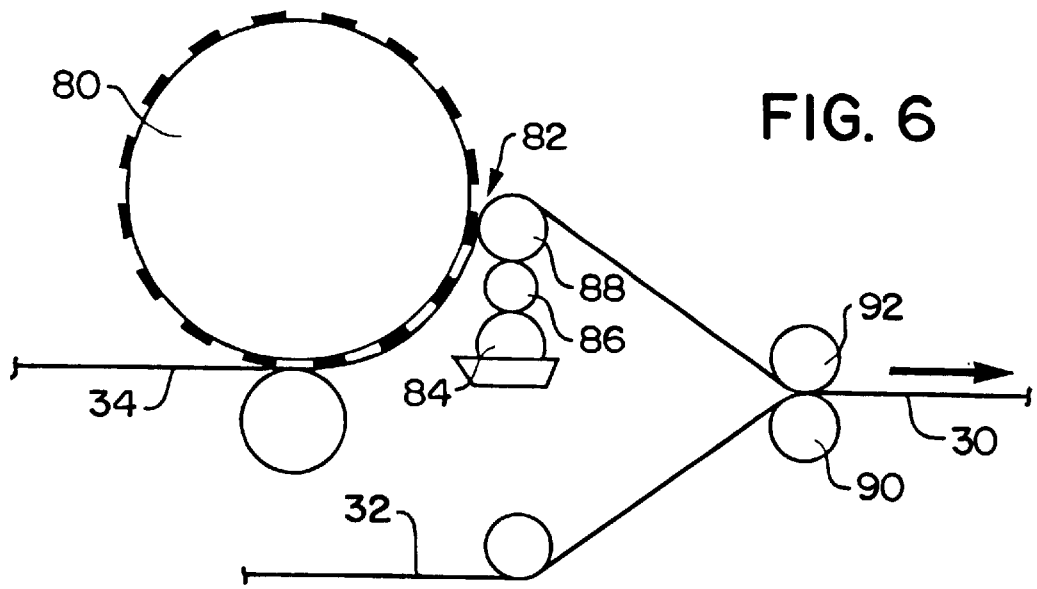
FIG. 6 is a plan view of one embodiment of a process for laminating paper webs together in accordance with the present invention.

Referring to FIG. 6, one embodiment of a process for laminating the first paper web 32 to the second paper web 34 is shown. In this embodiment, the second paper web 34 is embossed by an embossing roll 80 and fed through an adhesive application station 82. In this embodiment, the adhesive application station is an offset printer in which a first roller 84 is dipped into an adhesive. The adhesive is transferred to a second roller 86 and then to a third roller 88 before being applied to the paper web 34. It should be understood, however, that the adhesive can be applied to the web in other ways, such as by spraying.

Once the adhesive is applied to the second paper web 34, the second paper web 34 is joined to the first paper web 32 by a pair of press rollers 90 and 92. Once joined together, the laminate 30 is formed.

Figure 7:
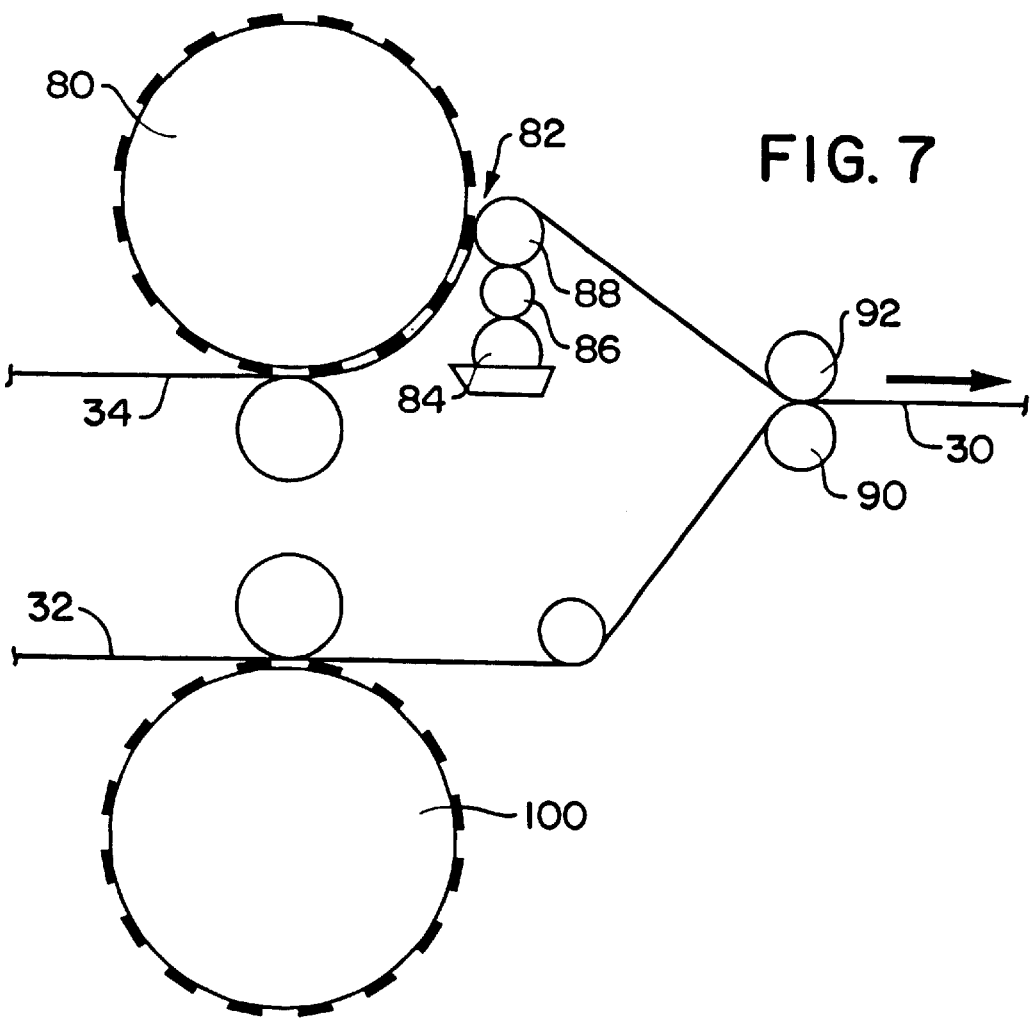
FIG. 7 is a plan view of an alternative embodiment of a process for laminating paper webs together in accordance with the present invention.

Referring to FIG. 7, an alternative embodiment of a process for attaching the two webs together is shown. In this embodiment, both of the paper webs 32 and 34 are embossed prior to being laminated together. For instance as shown, the first paper web 32 is fed through an embossing roll 100. Similar to FIG. 6, in this embodiment, the second paper web 34 is also embossed by the embossing roll 80 and coated with an adhesive at the adhesive station 82. Once the adhesive is applied, the second web 34 is mated with the first web 32 by the press rollers 90 and 92. Depending upon the pattern embossed into the webs and the relative position of the webs, the webs 32 and 34 can be joined in a nested relationship or in a pin-to-pin relationship.

Figure 8:
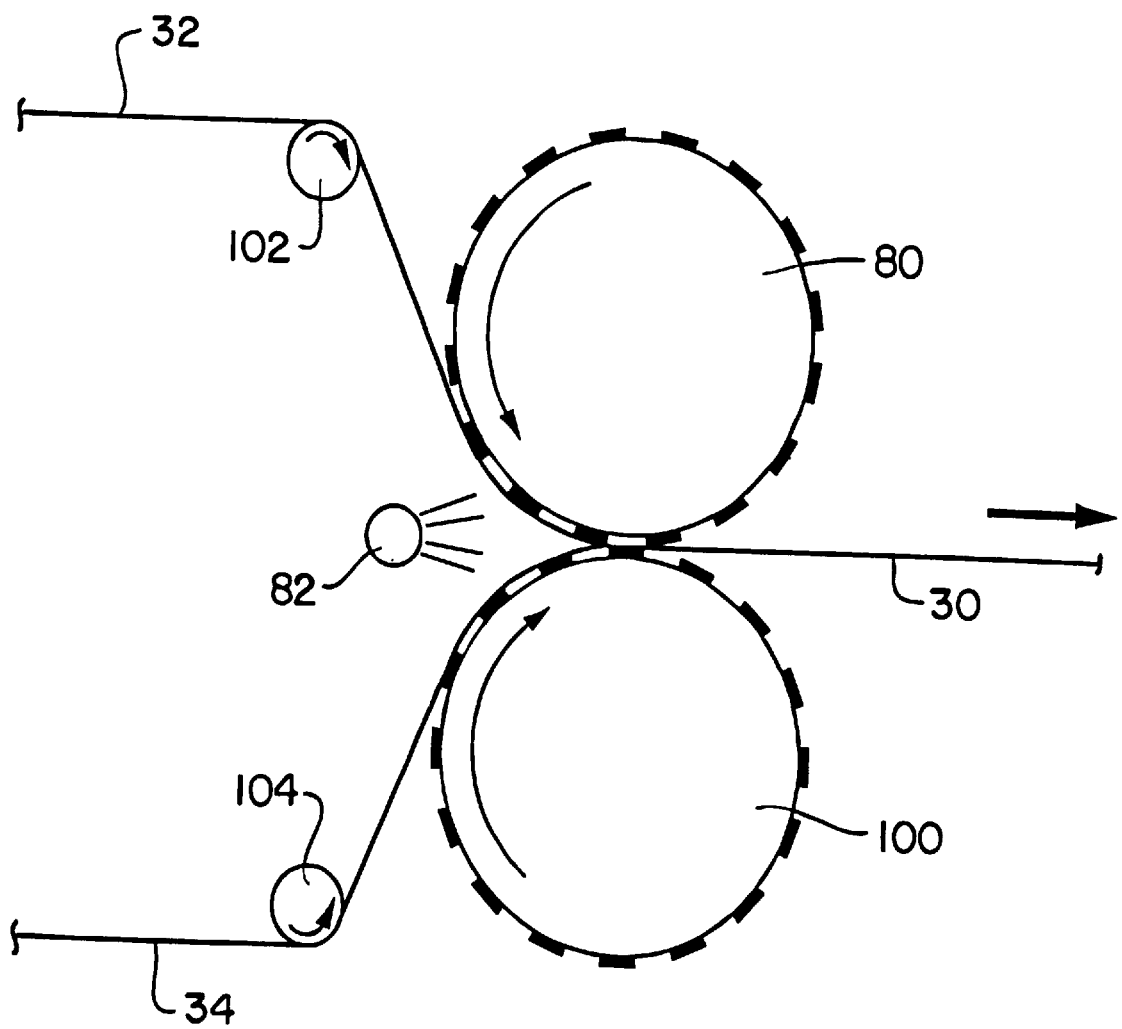
FIG. 8 is a plan view of another alternative embodiment of a process for laminating paper webs together in accordance with the present invention.

One embodiment of a process for joining two webs together in a non-nested pin-to-pin or random pin-to-pin relationship is shown in FIG. 8. As illustrated, the first paper web 32 and the second paper web 34 are embossed by the embossing rolls 80 and 100. The paper webs are brought in to contact with the embossing rolls by press rolls 102 and 104. The embossing rolls 80 and 100 have embossing knuckles extending outwardly from their circular periphery, and the press rolls 102 and 104 each have an elastomer cylindrical cover. In this embodiment, the embossing rolls 80 and 100 are positioned with respect to each other to mesh the knuckles on the upper embossing roll 80 with the knuckles on the lower embossing roll 100.

As shown, the paper webs 32 and 34 are fed into the nip formed by the two embossing rolls. Once fed into the nip, the webs are subjected to the knuckles on the embossing rolls. As described above, the knuckles are positioned with respect to each other to mesh such that the knuckles on the embossing rolls are offset. The contact between the knuckles is made with sufficient force to mechanically work the two webs together and join them. Although not necessary, one of the webs can be contacted with an adhesive at the adhesive station 82. In this embodiment, the adhesive is applied through spraying.

Besides the above methods for joining the webs, it should be understood that any suitable manner for laminating the two webs together can be used in the present invention. For example, various methods for attaching two webs together are disclosed in U.S. Pat. No. 3,940,529 to Hepford et al., U.S. Pat. No. 4,100,017 to Flautt, and U.S. Pat. No. 6,136,422 to Lichtenberg, et al., which are all incorporated herein by reference.

When using an adhesive as shown in FIGS. 6 through 8, the adhesive can be applied evenly over one or more surfaces of the plies or can be applied at selected locations. Further, besides the use of adhesives, is should be understood that other binder materials can be used. For example, binder fibers can be applied in between the plies for bonding the plies together. When using binder fibers, the two plies are heated and thermally bonded together by melting at least a portion of the binder fibers.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A paper wiping product comprising:
   a first outer ply comprising an uncreped, throughdried paper web, said first outer ply having a basis weight of from about 15 gsm to about 80 gsm and a textured surface having an Overall Surface Depth of greater than about 0.1 mm; and
   a second outer ply bound to said first outer ply, said second outer ply comprising a paper web, said second outer ply having a basis weight less than said first outer ply, said second outer ply comprising softwood fibers and hardwood fibers and having surfaces less textured than the textured surface of the first outer ply.

2. A paper wiping product as defined in claim 1, wherein said product consists essentially of said first outer ply and said second outer ply.

3. A paper wiping product as defined in claim 1, wherein said first outer ply and said second outer ply are secured together by an adhesive.

4. A paper wiping product as defined in claim 3, wherein said adhesive comprises polyvinyl alcohol, an acetate, or a starch.

5. A paper wiping product as defined in claim 1, wherein said first outer ply is embossed and nested together with said second outer ply.

6. A paper wiping product as defined in claim 1, wherein said first outer ply and said second outer ply are in a pin-to-pin relationship.

7. A paper wiping product as defined in claim 1, wherein said textured surface has an Overall Surface Depth of from about 0.2 mm to about 0.6 mm.

8. A paper wiping product as defined in 1, wherein said first outer ply has a basis weight of from about 20 gsm to about 27 gsm, said second outer ply having a basis weight of from about 19 gsm to about 23 gsm.

9. A paper wiping product as defined in claim 1, wherein said first outer ply comprises at least about 50% by weight softwood fibers.

10. A paper wiping product as defined in claim 9, wherein said first outer ply comprises up to 30% by weight high-yield fibers.

11. A paper wiping product as defined in claim 1, wherein said second outer ply comprises a creped tissue web.

12. A paper wiping product as defined in claim 11, wherein said creped second outer ply is also throughdried.

13. A paper wiping product as defined in claim 1, wherein said second outer ply comprises an uncreped throughdried tissue web.

14. A paper wiping product as defined in claim 1, wherein said second out ply comprises at least 50% by weight eucalyptus fibers.

15. A paper wiping product as defined in claim 1, wherein said first outer ply has a density of less than about 0.3 g/cm$^3$.

16. A process for producing a laminated wiping product comprising:
    forming a paper web from an aqueous slurry of fibers;
    throughdrying said paper web without creping said paper web, said paper web having a basis weight of from about 20 gsm to about 80 gsm, said paper web being dried on a throughdrying fabric having from about 5 to about 300 impression knuckles per square inch, said knuckles being raised at least 0.005 inches above the plane of the fabric, wherein, during drying, the paper web is macroscopically rearranged to conform to the surface of the throughdrying fabric to form a textured surface on the web;
    and laminating said paper web to an embossed tissue web, said tissue web comprising softwood fibers and hardwood fibers.

17. A process as defined in claim 16, wherein the formed textured surface of the paper web has an Overall Surface Depth of greater than about 0.2 mm, the textured surface forming an exterior surface of the laminated wiping product.

18. A process as defined in claim 16, wherein the paper web comprises softwood fibers and high-yield fibers, said high-yield fibers being present in the web in an amount up to about 30% by weight.

19. A process as defined in claim 16, wherein the paper web is secured to the embossed tissue web by a binder material.

20. A process as defined in claim 18, wherein the tissue web comprises softwood fibers, hardwood fibers and high-yield fibers.

21. A process as defined in claim 16, wherein the tissue web has a basis weight less than the basis weight of the paper web.

22. A process as defined in claim 16, wherein the paper web and the tissue web are embossed and nested together during the laminating step.

23. A process as defined in claim 16, wherein the tissue web comprised a creped web.

24. A process as defined in claim 23, wherein the tissue web is throughdried.

25. A paper wiping product comprising:
    a first outer ply comprising an uncreped, throughdried paper web, the first outer ply having a basis weight of at least 15 gsm, the paper web comprising softwood fibers and high-yield fibers, said first outer ply including a textured surface defining an exterior surface of the wiping product, the textured surface having an Overall Surface Depth of greater than about 0.1 mm; and
    a second outer ply secured to said first outer ply by a binder material, said second outer ply comprising a paper web containing high-yield fibers and fibers selected from the group consisting of softwood fibers, hardwood fibers and mixtures thereof, said second outer ply having a basis weight less than said first outer ply.

26. A paper wiping product as defined in claim 25, wherein the first outer ply is embossed and nested together with the second outer ply.

27. A paper wiping product as defined in claim 25, wherein the second outer ply includes a surface that defines an exterior surface of the paper wiping product, the surface of the second outer ply being less textured than the textured surface of the first outer ply.

28. A paper wiping product as defined in claim 25, wherein the first outer ply has a basis weight of from about 20 gsm to about 27 gsm, and said second outer ply has a basis weight of from about 19 gsm to about 23 gsm.

29. A paper wiping product as defined in claim 25, wherein the second outer ply is creped and embossed.

30. A paper wiping product as defined in claim 25, wherein the first outer ply has a density of less than about 0.3 g/cm$^3$.

* * * * *